(12) United States Patent
Tobon et al.

(10) Patent No.: US 12,553,462 B2
(45) Date of Patent: Feb. 17, 2026

(54) SCREW FOR SECURING A DENTAL PROSTHESIS

(71) Applicants: Tobon Enterprises Corp, Cypress, TX (US); Uniqa Dental LTD, Netanya (IL)

(72) Inventors: Jeffry Tobon, Cypress, TX (US); Samyon Kupchan, Netanya (IL); Daniel Goberman, Netanya (IL)

(73) Assignees: Tobon Enterprises Corp, Cypress, TX (US); Uniqa Dental LTD, Netanya (IL)

( * ) Notice: Subject to any disclaimer, the term of this patent is extended or adjusted under 35 U.S.C. 154(b) by 235 days.

(21) Appl. No.: 18/135,247

(22) Filed: Apr. 17, 2023

(65) Prior Publication Data

US 2024/0344546 A1    Oct. 17, 2024

(51) Int. Cl.
| | | |
|---|---|---|
| *A61C 8/00* | (2006.01) | |
| *F16B 23/00* | (2006.01) | |
| *F16B 39/282* | (2006.01) | |
| *F16B 35/04* | (2006.01) | |

(52) U.S. Cl.
CPC ........ *F16B 23/0061* (2013.01); *A61C 8/0068* (2013.01); *F16B 39/282* (2013.01); *F16B 35/048* (2013.01)

(58) Field of Classification Search
CPC ...... F16B 35/048; F16B 35/06; F16B 35/065; F16B 39/282; A61C 8/0022; A61C 8/0024; A61C 8/0025; A61C 8/0028; A61C 8/0069; A61C 8/0071
USPC .......................................... 411/399, 187, 959
See application file for complete search history.

(56) References Cited

U.S. PATENT DOCUMENTS

| | | | | |
|---|---|---|---|---|
| 2,037,586 | A * | 4/1936 | Olson .................... | F16B 39/282 411/959 |
| 3,821,871 | A * | 7/1974 | Schmitt ................... | F16B 31/06 411/487 |
| 5,104,318 | A * | 4/1992 | Piche .................... | A61C 8/0048 433/173 |
| 5,733,122 | A * | 3/1998 | Gordon ................ | A61C 8/0068 433/172 |
| 6,500,003 | B2 * | 12/2002 | Nichinonni .......... | A61C 8/0069 433/173 |
| 6,932,606 | B2 * | 8/2005 | Aravena .............. | A61C 8/0068 433/177 |
| 7,716,805 | B2 * | 5/2010 | Hommel ............... | F16B 35/048 411/399 |
| 8,382,414 | B2 * | 2/2013 | Vandenberg .......... | F16B 25/103 411/386 |
| 8,951,042 | B2 * | 2/2015 | Buchegger ........... | A61C 8/0037 433/173 |
| 9,763,754 | B2 * | 9/2017 | Haus .................... | A61C 8/0068 |
| 9,909,608 | B2 * | 3/2018 | Michiwaki ............ | F16B 39/282 |

(Continued)

*Primary Examiner* — Flemming Saether
(74) *Attorney, Agent, or Firm* — Rivka Friedman

(57) ABSTRACT

A screw (10) for securing a dental prosthesis directly to a dental abutment includes a threaded portion (12) lying within a virtual cylinder (14) of a first diameter D1, and a head portion (16) having a shaped recess (18) for receiving a driver. The head portion (16) has a second diameter D2 greater than first diameter D1. A conical clamping surface (20) lies between threaded portion (12) and head portion (16) and forms a conical angle α to a central axis (22) of the virtual cylinder, where α is between 25 and 35 degrees, and preferably around 30 degrees. The conical clamping surface may be provided with a number of anti-rotation grooves (26).

7 Claims, 4 Drawing Sheets

(56) References Cited

U.S. PATENT DOCUMENTS

| | | | |
|---|---|---|---|
| 10,470,852 B2* | 11/2019 | Xam-Mar Mangrane | A61C 8/0089 |
| 11,877,908 B2* | 1/2024 | Abenaim | A61C 8/0012 |
| 12,121,275 B2* | 10/2024 | Destainville | F16B 23/0023 |
| 2002/0123022 A1* | 9/2002 | Pilla | A61C 8/0068 433/172 |
| 2008/0050199 A1* | 2/2008 | Park | F16B 39/28 411/402 |
| 2009/0202962 A1* | 8/2009 | Xam-Mar Mangrane | A61C 8/0098 433/173 |
| 2019/0151051 A1* | 5/2019 | Padrós Roldán | A61C 8/0068 |
| 2021/0093424 A1* | 4/2021 | Lin | A61C 8/0089 |

\* cited by examiner

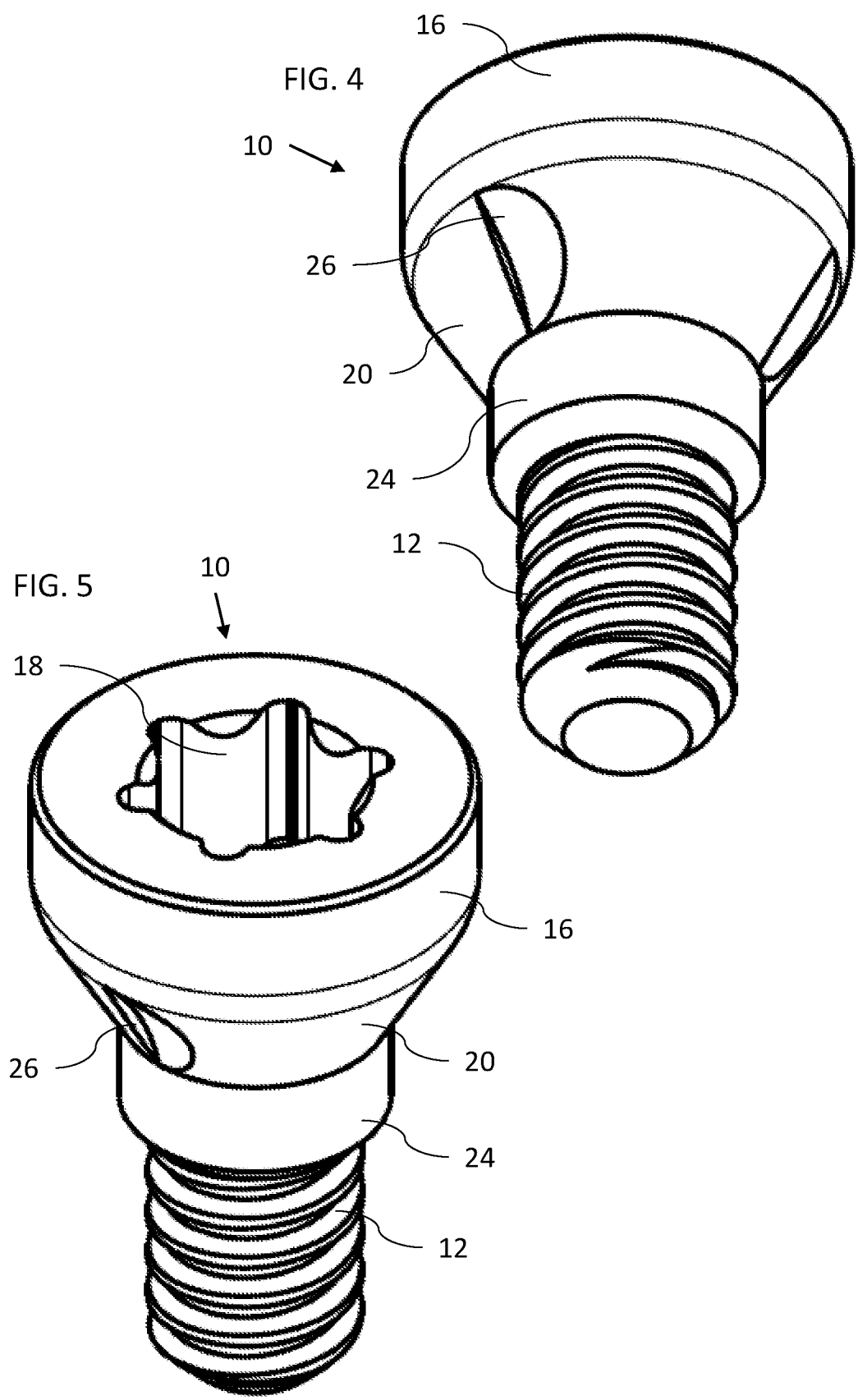

SCREW FOR SECURING A DENTAL PROSTHESIS

FIELD AND BACKGROUND OF THE INVENTION

The present invention relates to dental prostheses and, in particular, it concerns a screw for securing a dental prosthesis.

It is known known to secure a dental prosthesis, such as a temporary or permanent bridge, to one or more abutment, which is in turn fixed to a dental implant. A screw may be used to secure a prosthesis to an abutment. In certain cases, the desired angle for an access channel through the prosthesis for accessing and tightening the screw is significantly off-axis relative to a threaded bore of the abutment. This may be the case, for example, for aesthetic reasons, where the access channel to be filled with resin-based composite is preferably on a rear/lingual surface of the prosthetic tooth.

SUMMARY OF THE INVENTION

The present invention is a screw for securing a dental prosthesis.

According to the teachings of an embodiment of the present invention there is provided, a screw for securing a dental prosthesis directly to a dental abutment, the screw comprising: (a) a threaded portion for engaging a female thread of an abutment, the threaded portion lying within a virtual cylinder of a first diameter; (b) a head portion having a shaped recess for receiving a driver, the head portion having a second diameter greater than the first diameter; and (c) a conical clamping surface between the threaded portion and the head portion, the conical clamping surface forming a conical angle $\alpha$ to a central axis of the virtual cylinder, where a is between 25 and 35 degrees.

According to a further feature of an embodiment of the present invention, the conical angle $\alpha$ is 30 degrees±5%.

According to a further feature of an embodiment of the present invention, the second diameter is between 2.1 mm and 3 mm, and wherein the first diameter is at least 1 mm smaller than the second diameter.

According to a further feature of an embodiment of the present invention, the conical clamping surface includes a plurality of anti-rotation grooves, each of the anti-rotation grooves defining a step oriented to oppose a loosening rotation of the threaded portion.

According to a further feature of an embodiment of the present invention, each of the anti-rotation grooves is formed as a partial-cylindrical groove intersecting the conical clamping surface and terminating at the step.

According to a further feature of an embodiment of the present invention, the plurality of anti-rotation grooves are implemented as at least three anti-rotation grooves angularly spaced around the central axis.

According to a further feature of an embodiment of the present invention, there is also provided an un-threaded cylindrical portion having the first diameter interposed between the threaded portion and the conical clamping surface.

According to a further feature of an embodiment of the present invention, an extent of the conical clamping surface along the central axis is at least half of a length of the threaded portion along the central axis.

According to a further feature of an embodiment of the present invention, the shaped recess is a star socket.

BRIEF DESCRIPTION OF THE DRAWINGS

The invention is herein described, by way of example only, with reference to the accompanying drawings, wherein:

FIGS. 4 and 5 are a lower and an upper isometric view, respectively, of the screw of FIG. 1;

DESCRIPTION OF THE PREFERRED EMBODIMENTS

Figure 1:
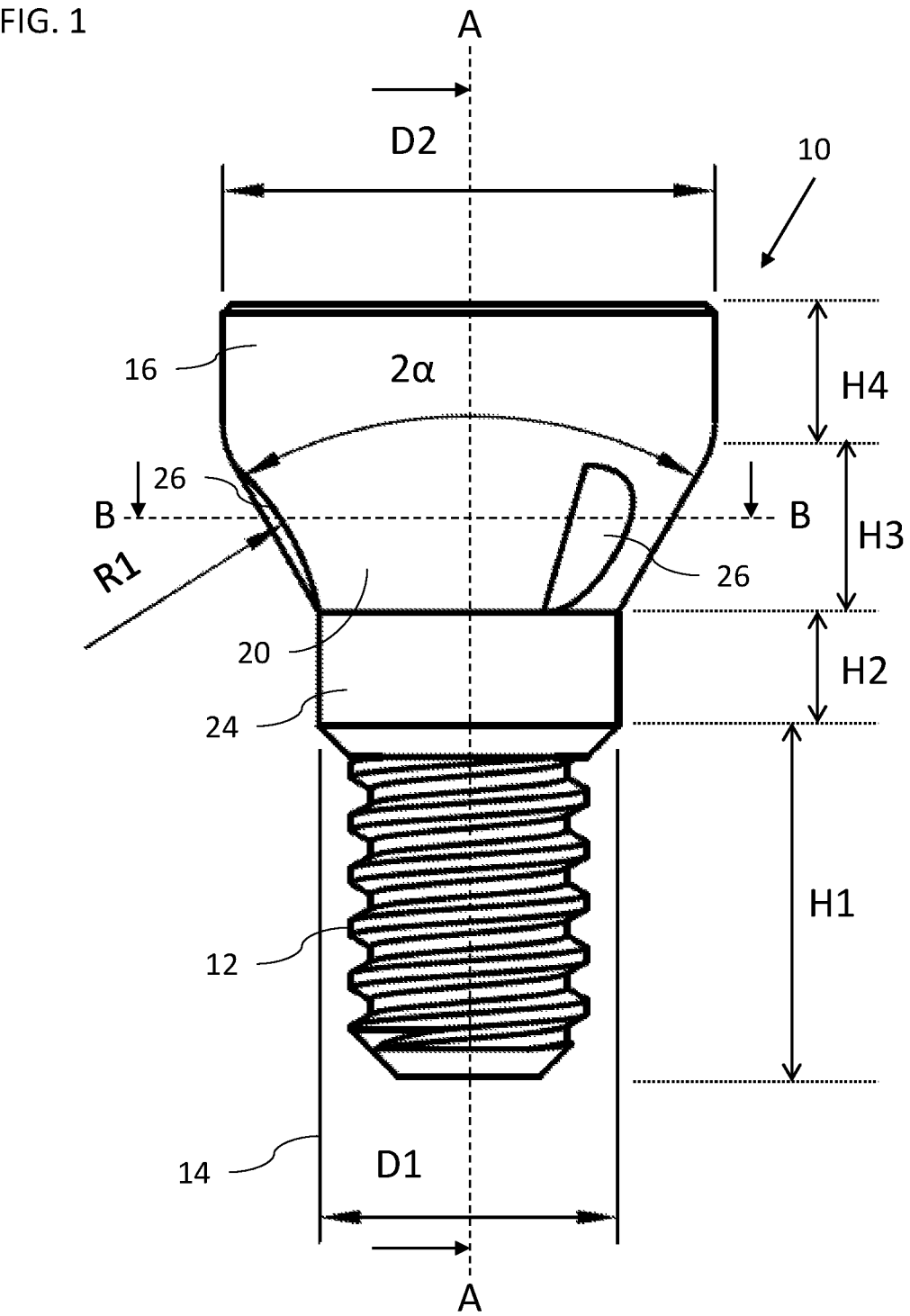
FIG. 1 is a side view of a screw, constructed and operative according to an embodiment of the present invention, for securing a dental prosthesis to a dental abutment.
Figure 2:
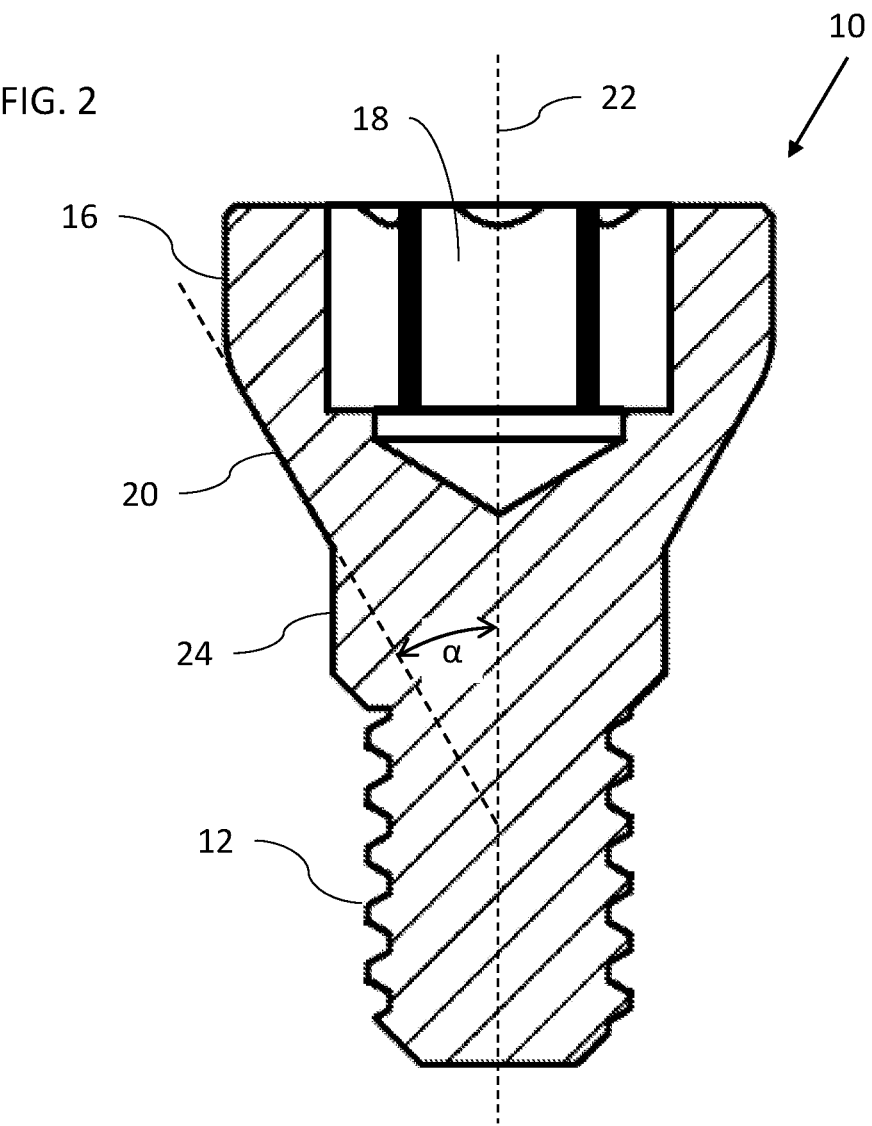
FIG. 2 is a cross-sectional view taken along the line A-A in FIG. 1.

The present invention is a screw for securing a dental prosthesis.

The principles and operation of screws, and corresponding assemblies and methods, according to the present invention may be better understood with reference to the drawings and the accompanying description.

Referring now to the drawings, FIGS. 1-5 show various views of a screw, generally designated 10, for securing a dental prosthesis directly to a dental abutment according to certain aspects of the present invention. In general terms, screw 10 includes a threaded portion 12 for engaging a female thread of an abutment. Threaded portion 12 lies within a virtual cylinder 14 of a first diameter D1. Screw 10 also includes a head portion 16 having a shaped recess 18 (best seen in FIGS. 2 and 5) for receiving a driver. Head portion 16 has a second diameter D2 greater than first diameter D1. A conical clamping surface 20 lies between threaded portion 12 and head portion 16. According to one aspect of the present invention, conical clamping surface 20 forms a conical angle $\alpha$ to a central axis 22 (FIG. 2) of the virtual cylinder, where a is between 25 and 35 degrees, preferably 30 degrees±10%, and most preferably 30 degrees±5%.

Figure 6A:
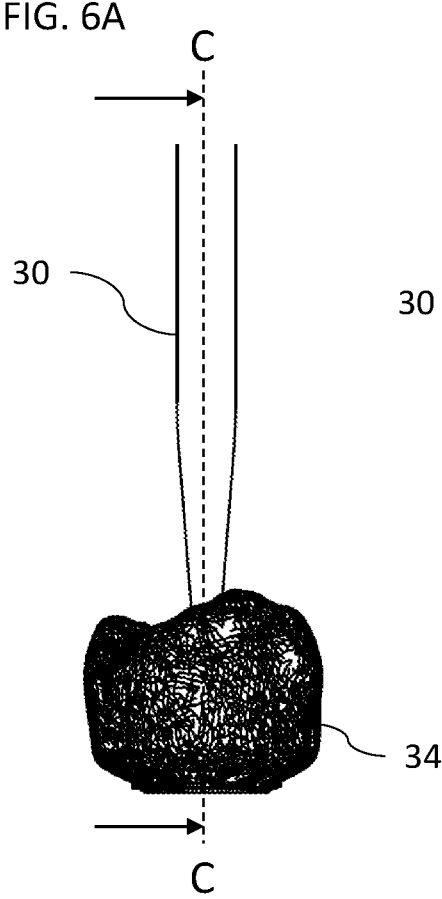
FIG. 6A is a front view of a dental burr being used to prepare an off-axis channel within a dental prosthesis for insertion of a screw according to the teachings of an embodiment of the present invention.
Figure 6B:
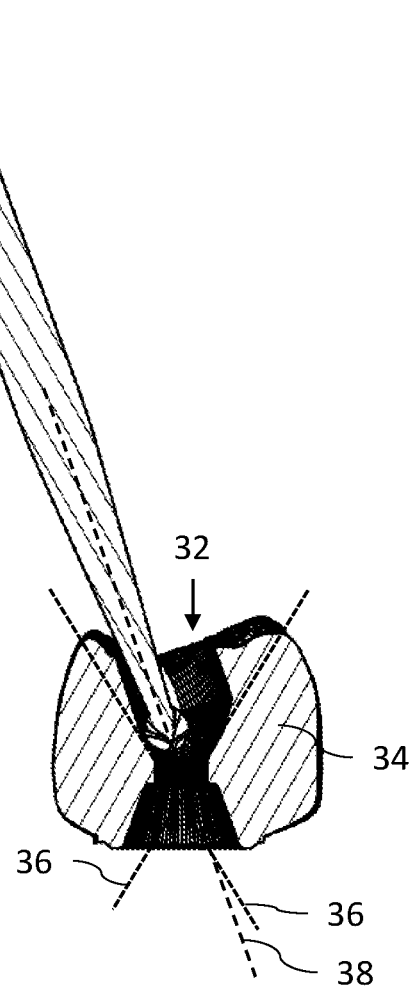
FIG. 6B is a cross-sectional view taken along the line C-C in FIG. 6A.

This particular choice of conical angle for the clamping surface has been found to provide a number of significant advantages, particularly where screw 10 is used for directly clamping the bulk material of a prosthesis to an abutment. The relatively large conical angle gives rise to an overall external cone angle $2a$ of 50-70 degrees, and preferably around 60 degrees, which provides effective clamping of the prosthesis without generating overly-large radially-outward forces on the implant material around the recess. Additionally, this relatively large conical angle enables the use of a dental burr inserted at off-axis angles approaching this conical angle to mill the corresponding contact surfaces within an access channel of the prosthesis, as illustrated in FIGS. 6A and 6B. These and other aspects of the present invention will be further understood in view of the detailed description below.

Turning now to the features of the particularly-preferred but non-limiting implementation illustrated here, the second diameter D2 is most preferably between 2.1 mm and 3 mm, while the first diameter D1 is preferably at least 1 mm smaller than the second diameter. The use of a screw with a head diameter approaching 3 millimeters, and with a conical clamping surface which typically narrows to a diameter of between 1.1 and 1.7 millimeters, allows the use of dental burrs with a diameter of about 2 millimeters for most of the milling process to generate the screw channel through the prosthesis, thereby greatly reducing the frequency of tool fracture compared to 1 mm burrs which are often required for smaller screw channels.

In certain particularly preferred implementations, an unthreaded cylindrical portion 24 of diameter D1 is interposed between threaded portion 12 and conical clamping surface 20. Cylindrical portion 24 defines a spacing from the end of the threaded portion to the conical clamping surface, thereby allowing sufficient thickness of the prosthesis material to provide mechanical strength against which the clamping forces are applied. This is particularly important for a temporary prosthesis, which is typically formed from relatively softer material than a permanent prosthesis, although it is preferable to employ the same screws for both. The diameter of the cylindrical portion, and the corresponding diameter of the "virtual cylinder" defining the diameter from which the narrower part of the conical clamping surface begins, may correspond to an external diameter of the thread of threaded portion 12, but does not necessarily do so. In certain preferred implementations as illustrated here, the diameter of the threaded portion lies is recessed inwardly from the virtual cylinder of diameter D1. The dimensions of the threading, including the thread pitch and the thread profile shape, are chosen to match the threaded bore of the abutment, as is known in the art.

Where cylindrical portion 24 is present, the height of the screw 10 can be conveniently subdivided into four portions, labeled H1-H4 in FIG. 1. Here, H1 is the length of threaded portion 12 along the central axis, H2 is the axial length of cylindrical portion 24, H3 is an extent of conical clamping surface 20 along the central axis, and H4 is the axial dimension of the part of head portion 16 above the conical clamping surface, which is typically also cylindrical. In certain particularly preferred implementations, the extent H3 of the conical clamping surface along the central axis is at least half of a length H1 of threaded portion 12 along the central axis. The other dimensions are typically dictated by the corresponding mechanical properties of the design: H2 to provide the aforementioned required thickness of the prosthesis material for structural strength of the prosthesis, particularly in the case of a temporary prosthesis, and H4 to provide sufficient depth of the screw head to accommodate the shaped recess 18.

Figure 3:
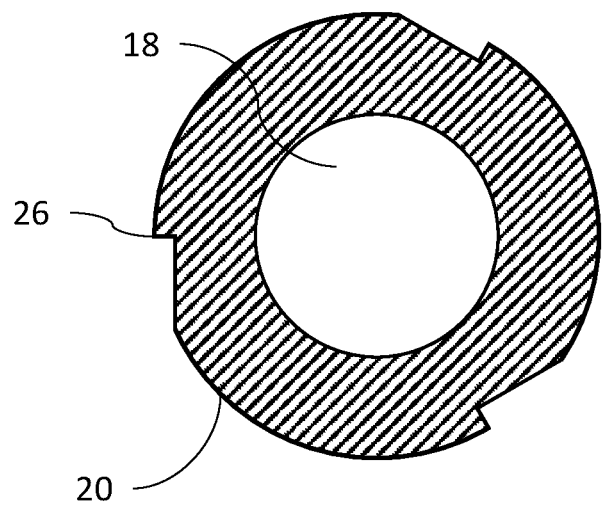
FIG. 3 is a cross-sectional view taken along the line B-B in FIG. 1.

It is a particular feature of certain particularly preferred implementations of screw 10 that conical clamping surface 20 includes a plurality of anti-rotation grooves 26, each defining a step oriented to oppose a loosening rotation of the threaded portion, as most clearly seen in the cross-sectional view of FIG. 3. Structurally, each of the anti-rotation grooves 26 may advantageously be formed as a partial-cylindrical groove intersecting the conical clamping surface and terminating at the step. The view of FIG. 1 illustrates the radius of curvature R1 of this partial-cylindrical groove which, in a typical case, may be about 1.5 mm. The step may approximate to part of a radial plane, i.e., may lie in a plane which passes through the central longitudinal axis of the screw. Preferably, at least three anti-rotation grooves 26 are provided, angularly spaced around the central axis. In the example illustrated here, exactly three are provided, spaced apart by 120 degrees about the central axis. The anti-rotation grooves are helpful, especially when used with temporary dental prostheses such as those made from acrylics, to prevent loosening of the screw over time.

The shaped recess 18 may be any type of screw head recess that is used in dental prosthesis screws, but is preferably a type of screw head recess which can be turned with a corresponding ball-head driver, so as to allow a considerable range of access angles for insertion of a driver. One particularly preferred but non-limiting option is a star socket, which is alternatively known as a hexalobular internal or TORX™ screw head. This choice of screw head recess is particularly preferred as it is highly effective at transferring torque to the screw while at the same time allowing the use of a ball-head star driver at off-axis driver axis angles of at least 20 degrees, and in some cases at least 25 degrees.

Turning now to the use of screw 10, corresponding also to a method according to the teachings of the present invention, FIGS. 6A and 6B illustrate schematically a milling process employing a dental burr 30 to form the upper part of a shaped channel 32 in a dental prosthesis 34 in preparation for receiving screw 10. Prosthesis 34 may be a crown as shown, or may be part of a bridge or other multi-unit prosthesis. Dashed lines 36 illustrate the angle of a conical contact surface against which conical clamping surface 20 it to be tightened, and dashed line 38 corresponds to the longitudinal rotation axis of dental burr 30. It will be noted that, when the access angle of dental burr 30 is off-axis relative to the screw bore axis, this limits the maximum gradient at which the burr can mill the contact surface. The fact that conical clamping surface 20, and hence also the contact surface of the prosthesis a surface, are at a relatively large angle to the axis enables the use of burr access angles 38 which are inclined at angles of up to the inclination 36 of the conical contact surface, i.e., as much as 25-35 degrees off-axis, and preferably up to about 30 degrees. This offers greater flexibility to employ access channels from rear and/or lingual faces of the prosthesis than is typically possible with conventional screws.

Figure 7:
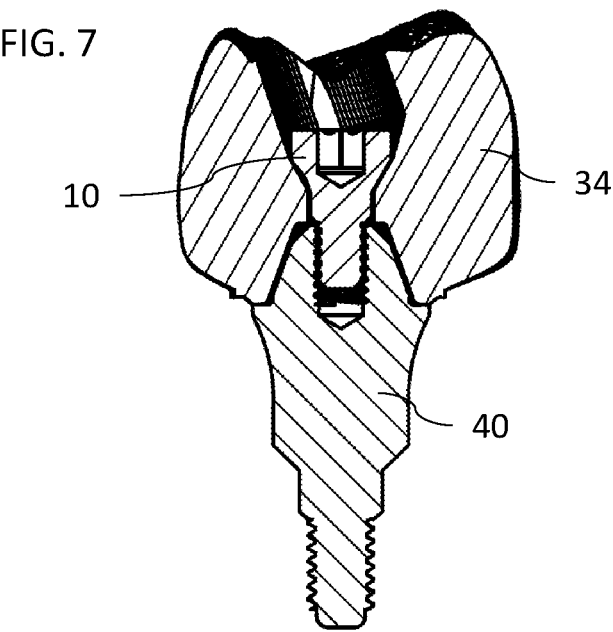
FIG. 7 is a cross-sectional view illustrating the dental prosthesis of FIG. 6 secured to an abutment by use of the screw of FIG. 1.

FIG. 7 illustrates the prosthesis of FIG. 6A-6B fixed to an abutment 40 by use of screw 10. The screw is tightened by use of a suitable driver, in this case preferably a star driver with a ball-head, thereby securing the prosthesis to the abutment.

It will be appreciated that the above descriptions are intended only to serve as examples, and that many other embodiments are possible within the scope of the present invention as defined in the appended claims.

What is claimed is:

1. A screw for securing a dental prosthesis directly to a dental abutment, the screw comprising:
   (a) a threaded portion for engaging a female thread of an abutment, said threaded portion lying within a virtual cylinder of a first diameter;
   (b) a head portion having a shaped recess for receiving a driver, said head portion having a second diameter greater than said first diameter;
   (c) a conical clamping surface between said threaded portion and said head portion, said conical clamping surface forming a conical angle α to a central axis of said virtual cylinder, where α is between 25 and 35 degrees, said conical clamping surface including a plurality of anti-rotation grooves, each of said anti-rotation grooves defining a step oriented to oppose a loosening rotation of said threaded portion; and (d) an un-threaded cylindrical portion having said first diameter interposed between said threaded portion and said conical clamping surface.

2. The screw of claim 1, wherein said conical angle α is 30 degrees±5%.

3. The screw of claim 1, wherein said second diameter is between 2.1 mm and 3 mm, and wherein said first diameter is at least 1 mm smaller than said second diameter.

4. The screw of claim 1, wherein each of said anti-rotation grooves is formed as a partial-cylindrical groove intersecting said conical clamping surface and terminating at said step.

5. The screw of claim 1, wherein said plurality of anti-rotation grooves are implemented as at least three anti-rotation grooves angularly spaced around said central axis.

6. The screw of claim 1, wherein an extent of said conical clamping surface along said central axis is at least half of a length of said threaded portion along said central axis.

7. The screw of claim 1, wherein said shaped recess is a star socket.

\* \* \* \* \*